Sept. 10, 1957  H. P. G. A. R. VON ZBOROWSKI  2,805,831
TUNNEL-SHAPED HOLLOW AERODYNAMIC COMPONENTS
Filed March 19, 1954  2 Sheets-Sheet 1
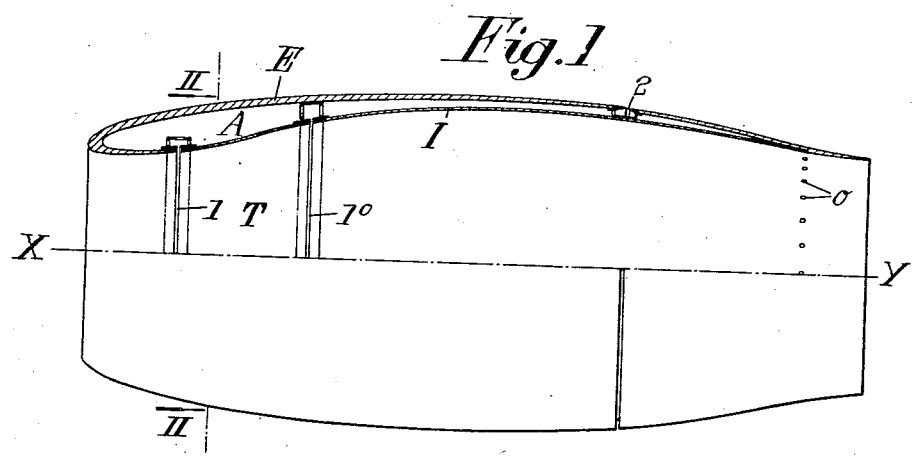
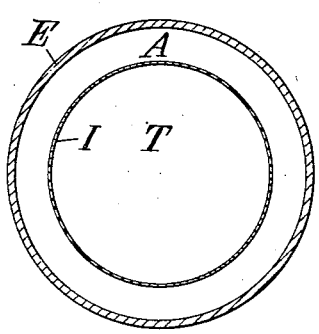
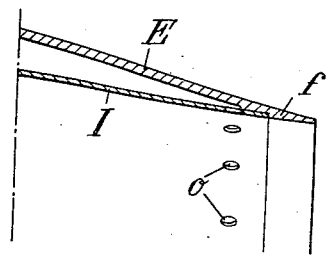
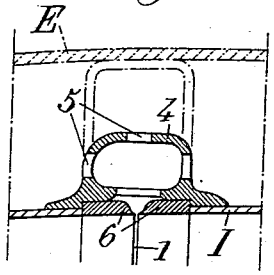
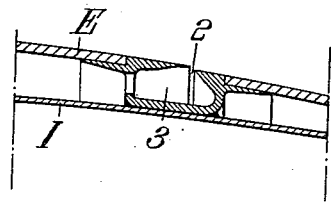
INVENTOR
Helmut Ph.G.A.R.von Zborowski
BY
Richardson, David and Norton
his ATTORNEYS.

United States Patent Office 2,805,831
Patented Sept. 10, 1957

2,805,831
TUNNEL-SHAPED HOLLOW AERODYNAMIC COMPONENTS

Helmut P. G. A. R. von Zborowski, Saint-Antoine par Brunoy, France

Application March 19, 1954, Serial No. 417,383

Claims priority, application France May 27, 1953

9 Claims. (Cl. 244—35)

The present invention relates to a tunnel-shaped hollow aerodynamic components, this expression designating tunnel-shaped structure the wall of which is hollow and includes an internal skin portion and an external skin portion, said internal and external skin portions forming, in longitudinal section of said wall, an airfoil profile.

In my prior U. S. patent application Ser. No. 325,290, filed December 11, 1952, for "Improvements in Hollow Streamlined Bodies Exposed to a Relative Wind, in Particular to Hollow Wings and Aerodynamic Components," I described a structure of such kind provided with means for exerting upon the inside face of the skin thereof a fluid pressure capable of pre-stressing said skin to prevent inward deformations thereof beyond a predetermined position.

The object of the present invention is to improve such a construction so as to make it possible further to reduce the weight thereof for predetermined resistance requirements.

According to the present invention, I further provide means for automatically adjusting the ratio of the pressures existing on the respective opposed faces of the inner skin portion so that, at least for most of said inner skin portion, the resultant of the pressure forces acting at every point is directed outwardly, that is to say in the same direction as for the external skin portion.

Preferred embodiments of my invention will be hereinafter described with reference to the accompanying drawings, given merely by way of example, and in which:

Fig. 1 is a diagrammatical view showing partly in axial section and partly in elevation a hollow structure according to my invention capable of acting both as a tunnel-shaped wing for subsonic flying and the casing of a ram-jet.

Fig. 2 is a cross section on the line II—II of Fig. 1.

Figs. 3 to 5 are views on an enlarged scale showing details of the structure of Fig. 1.

Figure 6:
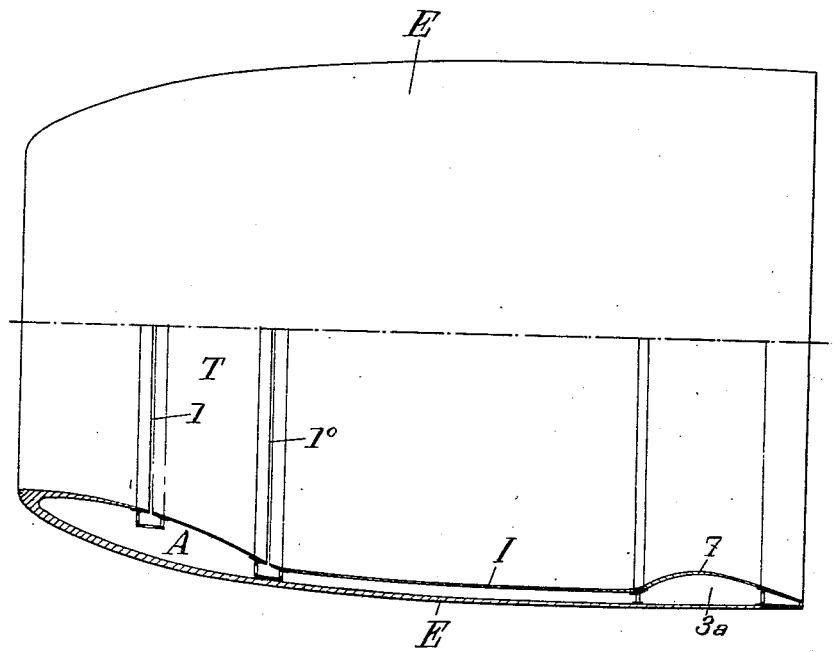
Fig. 6 shows, similarly to Fig. 1, a hollow tunnel-shaped wing for supersonic flying.
Figure 7:
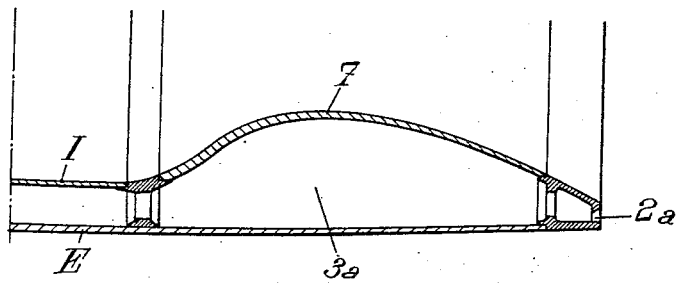

Finally Fig. 7 is an enlarged view of a detail of Fig. 6.

Before proceeding with the description of examples of structures according to my invention, I will define what I mean by the term "outward" as applied to pressures acting upon the covering skin elements with which my invention is concerned.

The "outward" direction is that from the inner space of the aerodynamic component toward the external atmosphere surrounding said component.

In the case of a wing of conventional construction, a cross section (i. e. one by a plane at right angles to the fore and aft direction) shows only one skin outline and the above mentioned "inner space" is the volume limited by this skin. No misunderstanding is possible and the "inner space" is the inside of the wing.

But in the case of a tunnel-shaped hollow wing, a cross section such as that of Fig. 2 of the drawings shows two distinct skin portions, one E in contact with the external atmosphere and which will be called outer or external skin portion and the other I in contact with the stream of air (or mixture of air and gas) flowing through the tunnel space T formed by the wing and which will be called inner or internal skin portion. The annular space A between the outer and inner skin portions E and I forms the inside of the wing but what I call the "inner space" of the wing is the tunnel space T limited by the inner skin portion I.

Therefore, in this application, when I say that a skin element is subjected to an "outward" pressure, this means that this pressure is directed from the inside of the tunnel toward the atmosphere around the wing. With this definition, a pressure applied to a point of the inner or internal skin portion I toward the inside of the wing annular space is an outward pressure because it is directed outwardly with respect to the tunnel space.

In the following description, it will be supposed that the structure made according to my invention constitutes both a hollow tunnel-shaped wing and the casing of a ram-jet.

The structure as shown by Figs. 1 and 2 is constituted by a toroidal body generated by revolution, about an axis X Y, of an airfoil section corresponding to the flying conditions (and in particular of the Mach number) of the aircraft, the airfoil shown by Fig. 1 corresponding to a subsonic flying machine.

According to what was described in my above mentioned prior U. S. application, I reduce the stresses imposed on the external portion E of the skin by providing in at least most of the space limited between the skin portions E and I a pressure higher than the static pressure of the surrounding atmosphere, whereby, under flying conditions, the resultant of the pressure forces at every point is directed outwardly, at least for the essential zones of said external skin portion E.

This setting under pressure of space A is advantageously obtained by air intakes which will be more fully described hereinafter.

However, in order to obtain the best possible results, the same kind of prestressing must be obtained, under all conditions, for the inner skin portion.

The chief object of the present invention is to obtain this result.

According to my invention, I provide means for automatically adjusting the ratio of the pressures acting upon the respective opposed faces of the inner skin portion I in such manner that, at least for the essential zones of said inner skin portion I, the resultant of the pressure forces acting at every point is directed outwardly when the engine is in flying conditions, both when the ram-jet is in operation and when it is stopped.

In this way, it is possible to reduce the weight of both the outer and the inner skin portions of the wing and thus to obtain a substantial gain of weight for said wing, without impairing its resistance and its rigidity.

By way of example and in order to show the great advantage obtained by the construction according to my invention, it may be stated that in the case of a supersonic flying machine of metallic construction, the total weight may be three or four times smaller that that of an equivalent machine of conventional construction.

In the case of a subsonic flying machine or of a machine made of a special material such as glass fiber, the gain of weight is still greater.

In the case of a tunnel-shaped wing forming the casing of a ram-jet (Figs. 1–7), the means for obtaining the desired pressure resultant on the inner skin portion I are advantageously based upon the fact that said inner skin portion I must be made, over a relatively long portion thereof, starting from the leading edge of the wing, in the form of a diffuser which slows down the air stream which enters the ram-jet and therefore increases the pressure exerted by said air stream on the inner skin portion I.

The above mentioned means are therefore constituted by at least one air intake 1 located in a part of the inner skin portion I where the air stream is already, but only partly, slowed down.

Thus, for the zone of skin portion I located downstream of said air intake 1, the pressure inside space A will be lower than that inside tunnel T, because the pressure inside space A is that existing at the level of air intake 1, whereas the pressures inside tunnel T are gradually increasing as the air stream flowing therethrough is being more and more slowed down in the diffuser portion of said tunnel.

Thus, the zone above referred to of the inner skin portion I is truly subjected to resultant pressure forces directed from the inside of the tunnel toward the outside thereof.

In order to obtain a better local adaptation of this overpressure, I may provide several air intakes at different points located one behind the other in the longitudinal direction.

For this purpose, as shown by Fig. 1, I may provide two air intakes 1 and 1⁰ disposed one behind the other in the portion of the tunnel which acts as diffuser.

I might provide transverse partitions in space A, the compartments limited by these partitions being in communication with the respective air intakes.

In particular, in order to obtain the desired pressure action upon the rear part of space A (near the trailing edge of the structure), I may separate this rear part and connect it, through orifices o, with the inside of the nozzle. Such a construction is illustrated by Figs. 1 and 5.

It is generally advantageous, in order to avoid any dangerous increase of the overpressure existing in the inner space A of the tunnel-shaped wing, and in order to obtain different predetermined overpressures for different flying speeds, to provide means for achieving a controlled exhaust of the air present in said space.

For this purpose, I may, according to an arrangement which is not visible on the drawing, provide spring control exhaust valve means, such as safety valves, for connecting the inside of space A with the surrounding medium.

In this case, if necessary, said exhaust valve means are made in such manner that they can be placed out of action, or that the spring acting thereon is adjustable. In this way, it will be possible to adjust the overpressure inside space A.

Figs. 1 and 5 show another arrangement for the same purpose which is particularly simple and efficient and which consists in connecting the inner chamber A of the wing with the surrounding medium through at least one exhaust passage 2 the flow section of which is so determined, with respect to the flow section through air intakes 1, 1⁰, that the overpressures inside space A are limited to a suitable fraction of the dynamic pressure.

Such an automatic regulation arrangement, which is based upon the obtainment of a controlled pressure drop between the intake and the discharge of the air circulating through space A, is suitable for flying machines having any speed whatever up to and even above a value of the Mach number equal to two.

A suitable choice of the location of the exhaust passage or passages above referred to will achieve, in addition to the desired regulation effect, an improvement of the external flow along the wing and, in particular, along the portions of the external skin E where disturbances in the air flow may occur.

In other words, the air circulation through the inner space A of the wing may be used to achieve a blowing of the boundary layer.

For this purpose, it will suffice for instance to constitute the exhaust passage 2, as shown by Figs. 1 and 4, in the form of a circular blowing slot provided in the outer skin portion E of the wing, this slot being supplied with air from an annular conduit 3.

Concerning the shape of air intakes 1 and 1⁰, it seems advantageous to make them as shown on an enlarged scale by Fig. 3. With such a construction, every air intake is constituted by a circular slot extending over a cross section of the inner skin portion I, said slot opening into an annular chamber 4 the walls of which also serve to stiffen the wing structure. Said chamber 4 is housed inside the hollow wing and communicates with the inner space A thereof, through passages 5 the total flow section of which is substantially greater than the flow section through circular slot 1.

Advantageously, the edges 6 of slot 1 are annular pieces distinct from the inner skin I and from the walls of chamber 4, as shown by Fig. 3.

The air circulation between intake slots 1, 1⁰ and blowing slot 2 has the following advantages.

The constant renewal of the boundary layer along the outer skin E reduces the drag of the structure.

Furthermore, the suction exerted in the diffuser walls through the air intakes improves the air flow along the walls of said diffuser and makes it possible to obtain a gradual and well defined increase of the pressure from the inlet toward the outlet of the diffuser.

This improvement of the flow along the wall of the diffuser involves an increase of the efficiency of this element, which can therefore be made shorter and, therefore, of lighter weight. When the diffuser is mounted on a ram-jet, the efficiency of this ram-jet is increased due to the improved qualities of the diffuser, and the length of the combustion chamber of said ram-jet can be reduced, which further ensures a gain of weight.

Finally, when the diffuser belongs to a ram-jet engine, the flow of air through the inner space A of the hollow wing achieves a cooling of the combustion chamber which facilitates the construction of said chamber. In particular, it is possible to make use of some materials (in particular light metals instead of steel) which otherwise could not be used. Furthermore, it will be possible to make this chamber in such manner that the point which represents its wall on the resistance to heat diagram is located outside of the zones of said diagram which are considered as dangerous. These two possibilities will correspond for practical purposes to a gain of weight over conventional constructions.

Since the above mentioned features make it possible considerably to reduce the weight of the outer skin portion E and of the inner skin portion I of the wing, it is possible to make this wing in such manner that the only stressed skin portion thereof is the outer skin portion E. In this case, the outer skin portion E will be made of an aluminium or magnesium alloy or of an artificial plastic material (for instance a synthetic resin or bitumen mixed with an organic filler), or even possibly of synthetic glass (boron-silicate glass or glass fibre plate for instance). Of course, said outer portion skin E may be provided with reinforcing elements which may be constituted by the walls of chambers 4 as shown in dotted lines in Fig. 3.

When the stressed skin portion of the wing is constituted by the outer skin portion E, it is advantageous to combine with this skin portion the leading edge and trailing edge of the wing. In this case, the inner skin portion I is constituted by a mere guiding partition fixed (for instance by welding or gluing) to said leading and trailing edges, preferably in such manner as to permit relative expansions of the two skin portions so as to avoid any supplementary stressing due to said expansions.

Fig. 5 shows how the inner skin portion I is connected to the trailing edge f belonging to the outer skin portion E, so that there is no inward projection along the path of travel of the gaseous stream.

Of course, the same arrangement is to be used for connecting the inner skin portion I with the leading edge carried by the outer skin portion E.

When the inner skin portion I is intended to act merely as a guiding partition, it may be made of a sheet of light metal or of special steel (for instance nickel or chromium steel), having a good resistance to corrosion by the hot gases circulating through the ram-jet.

The various elements of the above described structure may be assembled together in any suitable way, in particular by welding or gluing, gluing being particularly advantageous in the case of elements made of a synthetic material, such elements forming for instance identical sectors the juxtaposition of which forms the desired annular wall.

The above described example relates to the case of subsonic flying speed.

As a matter of fact, these features can also be applied to machines flying at a speed corresponding to a Mach number higher than 1. It is only necessary, in this case, to modify the airfoil section.

Fig. 6 shows a tunnel-shaped wing the longitudinal section of which is shaped to correspond to supersonic flying speeds. This section is different from that shown by Fig. 1 chiefly concerning the diffuser inlet portion and the jet nozzle.

In this figure, the same elements are designated by the same reference numerals.

In the case of a supersonic wing, it will be advantageous to place the air exhaust in the vicinity of the wing trailing edge, and possibly in this trailing edge.

For this purpose, as shown by Fig. 7, the wall of jet nozzle 7 is made hollow and the inside space 3a thereof is connected with the exhaust slot 2a provided in the trailing edge of said hollow jet nozzle.

I might also provide two exhaust slots, one located in the trailing edge and the other in the outer skin portion E, in the vicinity of the rear edge thereof. One of these slots, for instance that opening into the trailing edge, might be controlled by a valve so as to limit the overpressure in case of too high a speed.

It should be indicated that the correct operation of the air intakes 1, 1⁰, in the case of a supersonic wing, is based upon the assumption that the flow through the diffuser is subsonic. This is generally the case due to the shock waves produced by the leading edge of the wing or possibly by the central body of the aircraft when such a central body exists.

I may however provide in the front portion of the diffuser and very close to the inlet thereof, obstacles to produce shock waves so that the flow downstream of these obstacles is truly subsonic. Such obstacles, which are preferably retractable, may be carried either by the diffuser, or by the central body of the aircraft when such a body exists.

With constructions as above described, both of the inner skin portion and the outer skin portion of the tunnel-shaped wing are subjected to pressures directed from the inside of the tunnel toward the outside, these pressures being advantageously suitable fractions of the dynamic pressure. Furthermore, the stresses to which said skins are subjected are practically independent of the flying speed because the compensating pressures vary in the same fashion as the speeds.

The advantages obtained according to my invention are particularly great when the aircraft is constituted essentially by a hollow tunnel-shaped wing which constitutes at the same time the casing of a ram-jet engine.

It is pointed out that the construction according to my invention makes it possible to reduce greatly the weight of the wing, this weight averaging 10 kilograms per square meter for supersonic airplanes flying at a Mach number equal to or higher than two and made of conventional materials. If special materials are used, this weight may be further reduced.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An aircraft component comprising a relatively elongated annular structure, said structure comprising inner and outer walls forming a chamber therebetween, said chamber in longitudinal section being of air foil shape, said structure having a passage therethrough from end to end thereof of which said inner wall forms the outer surface, said inner wall being formed at least in part as a diffuser having its minimum cross-section located substantially in the plane of the leading edge and diverging rearwardly from said plane for a substantial distance therefrom, said inner wall having aerodynamic air intake means therethrough into the chamber between the outer and inner walls located rearwardly by a substantial distance from the point of minimum cross-section and forwardly of the point of greatest cross-section at a point where the cross-section is between said minimum and maximum cross-sections, said inner wall being solid from the leading edge to said air intake means, whereby to produce within said chamber a pressure less than the pressure acting radially outwardly on the exterior of the inner wall of the component at the point of maximum cross-section of said passage.

2. A device as claimed in claim 1 having air outlet means therein rearwardly of said air intake means, said outlet means being of such dimensions as to maintain a substantial pressure within said chamber.

3. A device as claimed in claim 2 in which said air outlet means are located in the outer wall to act as boundary layer blowing means.

4. A device as claimed in claim 3 in which said air intake means consist of a slot in the inner wall extending around the whole periphery of said inner wall.

5. A device as claimed in claim 1 in which said air intake means consist of a slot in the inner wall extending around the whole periphery of said inner wall.

6. A device as claimed in claim 1, said air intake means including several air intake slots located in transverse planes one behind the other with respect to the longitudinal axis of said component.

7. An aerodynamic component according to claim 1 in which the passage limited by the inner wall is convergent at the rear part thereof, including, in the chamber between the inner and the outer walls, an annular partition located substantially in the transverse plane corresponding to the front end of said convergent rear part of the tunnel, said inner wall having holes therein at the rear end thereof.

8. A device as claimed in claim 7 having air outlet means therein rearwardly of said air intake means, said outlet means being of such dimensions as to maintain a substantial pressure within said chamber, said air outlet means being located in the outer wall forwardly of said partition to act as boundary layer blowing means.

9. A device as claimed in claim 1 in which said outer wall is substantially thicker than said inner wall.

References Cited in the file of this patent

UNITED STATES PATENTS

| | | |
|---|---|---|
| 1,084,099 | McMahon | Jan. 13, 1914 |
| 1,106,193 | Deperdussin | Aug. 4, 1914 |
| 1,529,988 | Denault | Mar. 17, 1925 |
| 1,757,879 | Rydberg | May 6, 1930 |
| 2,303,797 | Schlupp | Dec. 1, 1942 |
| 2,589,945 | Leduc | Mar. 18, 1952 |
| 2,632,295 | Price | Mar. 24, 1953 |

FOREIGN PATENTS

| | | |
|---|---|---|
| 301,704 | Germany | July 22, 1919 |
| 313,497 | Great Britain | Mar. 20, 1930 |
| 511,650 | Great Britain | Aug. 22, 1939 |
| 668,627 | France | July 16, 1929 |